(12) United States Patent
Goto

(10) Patent No.: US 10,259,208 B2
(45) Date of Patent: Apr. 16, 2019

(54) THREE-DIMENSIONAL SHAPED OBJECT MANUFACTURING DEVICE, METHOD FOR MANUFACTURING THREE-DIMENSIONAL SHAPED OBJECT, AND THREE-DIMENSIONAL SHAPED OBJECT

(71) Applicant: SEIKO EPSON CORPORATION, Tokyo (JP)

(72) Inventor: Junichi Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 482 days.

(21) Appl. No.: 14/626,389

(22) Filed: Feb. 19, 2015

(65) Prior Publication Data
US 2015/0251352 A1 Sep. 10, 2015

(30) Foreign Application Priority Data

Mar. 5, 2014 (JP) .................. 2014-043210

(51) Int. Cl.
*B33Y 30/00* (2015.01)
*B29C 64/141* (2017.01)
*B29C 64/165* (2017.01)
*B29L 9/00* (2006.01)

(52) U.S. Cl.
CPC ............ *B33Y 30/00* (2014.12); *B29C 64/141* (2017.08); *B29C 64/165* (2017.08); *B29L 2009/00* (2013.01); *Y10T 428/31511* (2015.04); *Y10T 428/31551* (2015.04); *Y10T 428/31663* (2015.04)

(58) Field of Classification Search
CPC .......................... B33Y 30/00; B29C 67/0074
See application file for complete search history.

(56) References Cited

U.S. PATENT DOCUMENTS

| | | | |
|---|---|---|---|
| 3,732,107 | A | 5/1973 | Faust |
| 3,857,885 | A | 12/1974 | Faust |
| 4,458,006 | A | 7/1984 | Doenges et al. |
| 4,495,271 | A | 1/1985 | Geissler et al. |
| 4,530,747 | A | 7/1985 | Donges et al. |
| 4,987,053 | A | 1/1991 | Gersdorf et al. |
| 5,200,299 | A | 4/1993 | Steppan et al. |
| 5,647,931 | A | 7/1997 | Retallick et al. |

(Continued)

FOREIGN PATENT DOCUMENTS

| | | |
|---|---|---|
| JP | 46-027926 A | 8/1971 |
| JP | 48-041708 A | 12/1973 |

(Continued)

*Primary Examiner* — Jacob T Minskey
*Assistant Examiner* — Melody Tsui

(57) ABSTRACT

A three-dimensional shaped object manufacturing device is adapted to manufacture a three-dimensional shaped object by laminating a layer formed using a three-dimensional shaping composition including three-dimensional shaping powder. The three-dimensional shaped object manufacturing device includes a shaping section configured and arranged to shape the three-dimensional shaped object, a layer forming unit configured and arranged to form the layer constituted by the three-dimensional shaping composition in the shaping section, and a distance detecting unit configured and arranged to detect a distance from a predetermined reference position to the layer forming unit.

14 Claims, 5 Drawing Sheets

(56) References Cited

U.S. PATENT DOCUMENTS

| | | | |
|---|---|---|---|
| 5,876,550 A * | 3/1999 | Feygin | B22C 9/00 |
| | | | 156/256 |
| 6,054,192 A | 4/2000 | Otsuka et al. | |
| 6,799,959 B1 | 10/2004 | Tochimoto et al. | |
| 2005/0104241 A1 * | 5/2005 | Kritchman | B33Y 30/00 |
| | | | 264/40.1 |

FOREIGN PATENT DOCUMENTS

| | | | | |
|---|---|---|---|---|
| JP | 51-047334 B | 12/1976 | | |
| JP | 54-021726 B | 8/1979 | | |
| JP | 57-196231 A | 12/1982 | | |
| JP | 59-005240 A | 1/1984 | | |
| JP | 59-005241 A | 1/1984 | | |
| JP | 01-165613 A | 6/1989 | | |
| JP | 02-226149 A | 9/1990 | | |
| JP | 08-502703 A | 3/1996 | | |
| JP | 10-217336 A | 8/1998 | | |
| JP | 2001-150556 A | 6/2001 | | |
| JP | 2014065179 A * | 4/2014 | | B29C 67/00 |

\* cited by examiner

THREE-DIMENSIONAL SHAPED OBJECT MANUFACTURING DEVICE, METHOD FOR MANUFACTURING THREE-DIMENSIONAL SHAPED OBJECT, AND THREE-DIMENSIONAL SHAPED OBJECT

CROSS-REFERENCE TO RELATED APPLICATIONS

This application claims priority to Japanese Patent Application No. 2014-043210 filed on Mar. 5, 2014. The entire disclosure of Japanese Patent Application No. 2014-043210 is hereby incorporated herein by reference.

BACKGROUND

Technical Field

The present invention relates to a three-dimensional shaped object manufacturing device, a method for manufacturing a three-dimensional shaped object, and a three-dimensional shaped object.

Related Art

A three-dimensional shaped object manufacturing device in which a three-dimensional object is shaped while bonding powder by using a bonding liquid is known (see, e.g., Japanese Laid-open Patent Application Publication No. 2001-150556). In this manufacturing device, the following operations are repeated to form the three-dimensional object. Initially, a powder layer is formed by thinly spreading the powder with a blade, and a bonding liquid is ejected to a desired part of the powder layer to bond the powder. As a result, in the powder layer, only the part of the powder layer where the bonding liquid was ejected is bonded, so that a thin plate-shaped member (hereinafter referred to as "unit layer") is formed. Thereafter, on the powder layer, an additional powder layer is thinly formed, and the bonding liquid is ejected to the desired portion. As a result, in the portion of the newly formed powder layer where the bonding liquid was ejected, a new unit layer is formed. At this point, the bonding liquid ejected on the powder layer penetrates to reach the previously formed unit layer, and therefore the newly formed unit layer is bonded to the previously formed unit layer. The thin plate-shaped unit layers are laminated one-layer by one-layer by repeating the operations. Thus, a three-dimensional object can be formed.

With such three-dimensional shaped object shaping technology (three-dimensional shaped object manufacturing device), an object can be immediately formed by bonding powder as long as three-dimensional shape data of the object to be formed is provided, and it is not required to make a mold prior to the shaping. Therefore, the three-dimensional object can be promptly formed at low cost. Also, the shaping is performed by laminating thin plate-shaped unit layers one-layer by one-layer. Therefore, even if the object is, for example, a complex member having an inner structure, the object can be formed as an integral shaped object without forming a plurality of components in a separate manner.

However, in a conventional three-dimensional shaped object manufacturing device, prompt detection was not possible when friction, damage, etc., of the layer forming unit occurs, thereby causing irregularities in the thickness of the layers, and therefore, it was difficult to manufacture a three-dimensional shaped object with sufficiently high dimensional accuracy.

SUMMARY

Objects of the present invention are to provide a three-dimensional shaped object manufacturing device capable of manufacturing a three-dimensional shaped object with high dimensional accuracy, a method of manufacturing a three-dimensional shaped object capable of manufacturing a three-dimensional shaped object with high dimensional accuracy, and a three-dimensional shaped object manufactured with high dimensional accuracy.

A three-dimensional shaped object manufacturing device according to one aspect is adapted to manufacture a three-dimensional shaped object by laminating layers formed using a three-dimensional shaping composition including three-dimensional shaping powder, and includes a shaping section configured and arranged to shape the three-dimensional shaped object, a layer forming unit configured and arranged to form the layer constituted by the three-dimensional shaping composition in the shaping section, and a distance detecting unit configured and arranged to detect a distance from a predetermined reference position to the layer forming unit.

With this, a three-dimensional shaped object manufacturing device capable of manufacturing a three-dimensional shaped object with high dimensional accuracy can be provided.

It is preferable that the three-dimensional shaped object manufacturing device is configured to adjust a thickness of the layer depending on detection result of the distance detecting unit. With this, a three-dimensional shaped object can be manufactured with higher dimensional accuracy.

In the three-dimensional shaped object manufacturing device, it is preferable that the shaping section includes a vertically movable shaping stage, and the thickness of the layer is adjusted by adjusting a lowering amount of the shaping stage. With this, a three-dimensional shaped object can be manufactured with higher dimensional accuracy.

In the three-dimensional shaped object manufacturing device, it is preferable that the distance from the reference position to the layer forming unit is adjusted by moving the layer forming unit. With this, a three-dimensional shaped object can be manufactured with higher dimensional accuracy.

In the three-dimensional shaped object manufacturing device, it is preferable that the layer forming unit is a unit selected from a group consisting of a squeegee and a roller. With this, the layer can be formed with a more even thickness, and the three-dimensional shaped object to be manufactured can have even higher dimensional accuracy. A method of manufacturing a three-dimensional shaped object is a manufacturing method of a three-dimensional shaped object using the three-dimensional shaped object manufacturing device described above. The method of manufacturing a three-dimensional shaped object includes a layer forming process which forms a layer in a shaping section using a layer forming unit and a distance detection process which detects a distance from a reference position to the layer forming unit using a distance detecting unit. With this, a three-dimensional shaped object with high dimensional accuracy can be provided.

A three-dimensional shaped object is manufactured by the three-dimensional shaped object manufacturing device described above. With this, a three-dimensional shaped object manufactured with high dimensional accuracy can be provided.

A three-dimensional shaped object is manufactured by the method of manufacturing of a three-dimensional shaped object described above. With this, a three-dimensional shaped object manufactured with high dimensional accuracy can be provided.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, preferred embodiments of the present invention will be described with reference to the attached drawings.

1. First Embodiment of Three-dimensional Shaped Object Manufacturing Device

First, a first embodiment of a three-dimensional shaped object manufacturing device of the present invention will be described.

Figure 1:
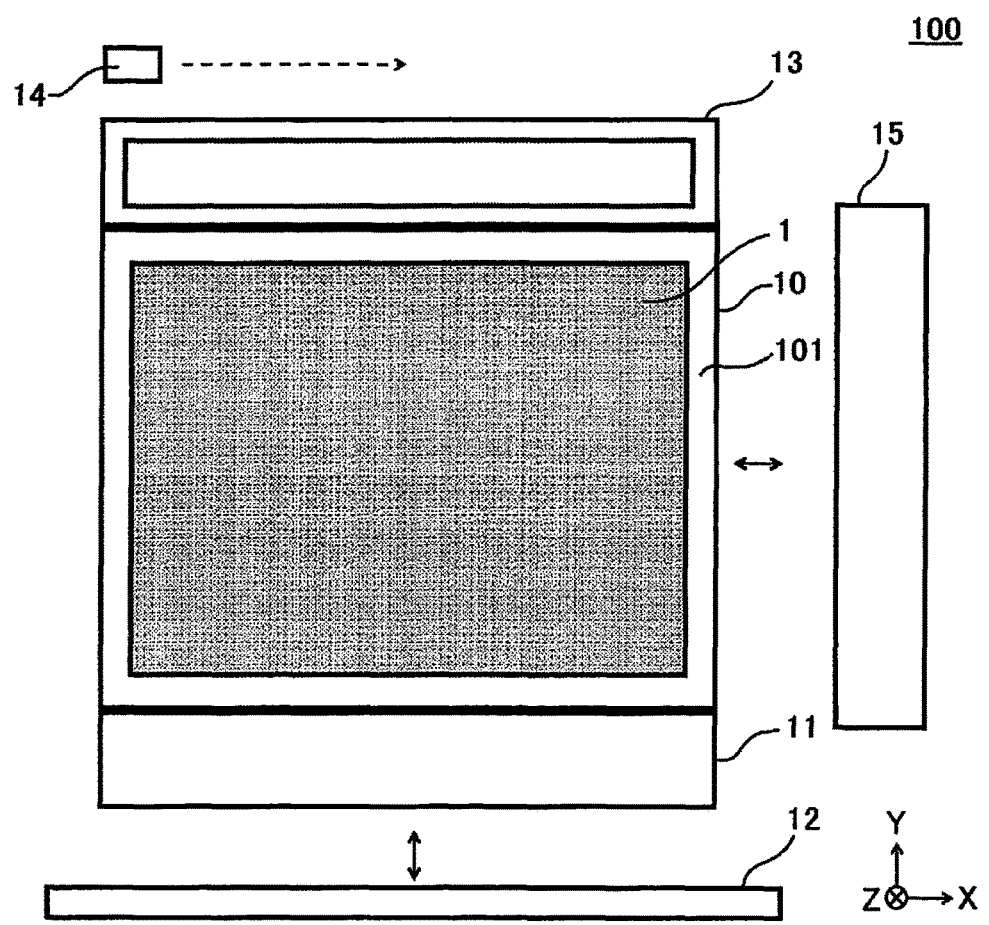
FIG. 1 is a plan view showing a first embodiment of a three-dimensional shaped object manufacturing device of the present invention viewed from above.
Figure 2:
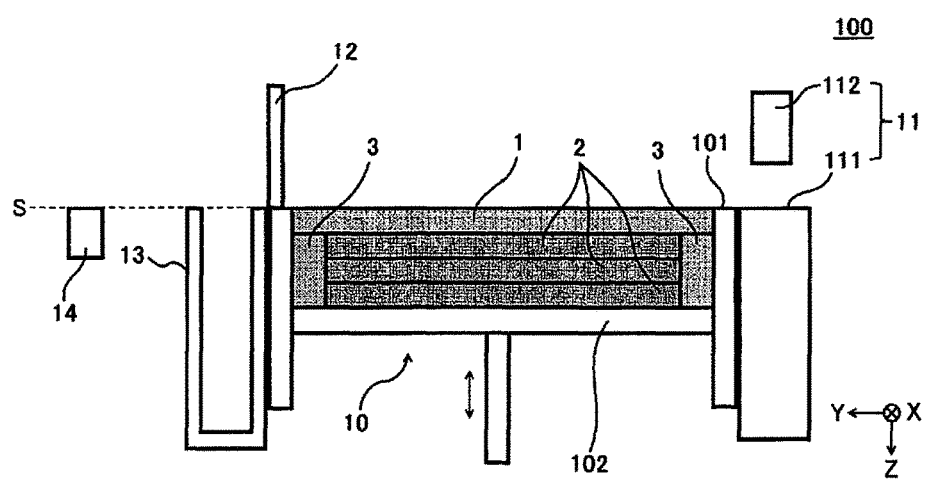
FIG. 2 is a cross-sectional view showing a three-dimensional shaped object manufacturing device shown in FIG. 1 viewed from the right side of the drawing.

FIG. 1 is a plan view showing the first embodiment of the three-dimensional shaped object manufacturing device of the present invention viewed from above, and FIG. 2 is a cross-sectional view showing the three-dimensional shaped object manufacturing device shown in FIG. 1 viewed from the right side of the drawing.

The three-dimensional shaped object manufacturing device 100 is a device for manufacturing a three-dimensional shaped object by laminating unit layers 2 formed using a three-dimensional shaping composition including three-dimensional shaping powder.

The three-dimensional shaped object manufacturing device 100, as shown in FIG. 1 and FIG. 2, includes a shaping section 10 for shaping a three-dimensional shaped object, a supply section 11 for supplying a three-dimensional shaping composition, a squeegee (layer forming unit) 12 for forming a layer 1 of the three-dimensional shaping composition on the shaping section 10 using the supplied three-dimensional shaping composition, a collection section 13 for collecting an excessive three-dimensional shaping composition when forming the layer 1, a distance detecting unit 14 for detecting the distance between the squeegee 12 and a reference position S, and an ejection section 15 for ejecting a bonding liquid including a bonding agent to the layer 1. Further, the three-dimensional shaping composition and the bonding liquid will be detailed later.

The shaping section 10 includes, as shown in FIG. 1 and FIG. 2, a frame body 101 and a shaping stage 102 provided inside the frame body 101. The frame body 101 is constituted by a frame-shaped member.

The shaping stage 102 has a rectangular shape in a XY plane. The shaping stage 102 is constituted to be driven (lifted and lowered) in the Z-axis direction by a driving unit that is not illustrated.

A layer 1 is formed in a region formed by the inner wall surface of the frame body 101 and the shaping stage 102. Further, the shaping section 10 is drivable in the X-axis direction by a driving unit that is not illustrated.

Then, the shaping section 10 moves in the X-axis direction, that is, to a drawing area of the ejection section 15 to be described later, and the bonding liquid is ejected to the layer 1 by the ejection section 15.

The supply section 11 has a function for supplying the three-dimensional shaping composition into the three-dimensional shaped object manufacturing device 10.

The supply section 11 includes a supply area 111 to which the three-dimensional shaping composition is supplied and a supply unit 112 for supplying the three-dimensional shaping composition to the supply area 111.

The supply area 111 has a rectangular shape that is long in the X-axis direction and is provided so as to be in contact with a side of the frame body 101. Further, the supply area 111 is provided to be flush with the upper surface of the frame body 101.

The three-dimensional shaping composition supplied to the supply area 111 is conveyed to the shaping stage 102 by the squeegee 12 to be explained later, and therefore the layer 1 is formed.

The squeegee (layer forming unit) 12 has a plate-shape which is long in the X-axis direction. Further, the squeegee 12 is constituted to be driven in the Y-axis direction by a driving unit that is not illustrated. Further, the squeegee 12 is configured so that a tip end thereof in the short-axis direction comes into contact with the upper surface of the frame body 101 and the supply area 111.

The squeegee 12 conveys the three-dimensional shaping composition supplied to the supply area 111 to the shaping stage 102 while moving in the Y-axis direction to form the layer 1 on the shaping stage 102.

In this embodiment, the moving direction of the squeegee 12 and the moving direction of the shaping section 10 are configured to intersect (to be orthogonal) with each other. With such a configuration, while the ejection section 15 is ejecting the bonding liquid, the formation of the next layer 1 can be prepared, which makes it possible to improve the production efficiency of the three-dimensional shaped object.

The collection section 13 is a box-shaped member with the upper end opened, and is provided as a separate body separated from the shaping section 10. The collection section 13 has a function for collecting an excessive three-dimensional shaping composition in forming the layer 1.

The collection section 13 is in contact with the frame body 101 and provided so as to face the supply section 11 via the frame body 101.

The excessive three-dimensional shaping composition conveyed by the squeegee 12 is collected by the collection section 13 and the collected three-dimensional shaping composition is reused.

The distance detecting unit 14 is provided with a function for detecting the distance from a reference position S to the tip of the squeegee 12. Further, in this embodiment, the same surface as the upper surface of the frame body 101 is defined as the reference position (reference surface) S.

In this embodiment, the distance detecting unit 14 is a contact-type probe-type sensor, which, when the squeegee 12 is moved to a portion above the distance detecting unit 14, is operated in the X-axis direction while making contact with the tip end of the squeegee 12 to thereby detect the distance from the reference position S to the tip end of the squeegee 12.

In a case in which the distances detected by the distance detecting unit 14 at each position of the tip end of the squeegee 12 in the X-axis direction are irregular, or in a case in which the distances are larger than a reference value determined in advance, etc., it means that the friction of the squeegee 12 has been progressed. In such a case, the three-dimensional shaped object manufacturing device 100 adjusts the thickness of the layer 1, the position of the squeegee 12, emits a signal to urge the squeegee 12 to be replaced, etc., using a control unit that is not illustrated.

Further, the adjustment of the thickness of the layer 1 is conducted by adjusting the amount of lowering the shaping stage 102, adjusting the position of the squeegee 12, etc.

The ejection section 15 has a function for ejecting the bonding liquid to the formed layer 1. Specifically, when the shaping section 10 in which the layer 1 was formed on the shaping stage 102 moves in the X-axis direction and has reached the drawing area below the ejection section 15, the bonding liquid is ejected from the ejection section 15 to the layer 1.

The ejection section 15 is an inkjet system in which droplet ejection heads for ejecting droplets of bonding liquids are mounted. Further, the ejection section 15 is provided with a bonding liquid supply section that is not illustrated. In this embodiment, a so-called piezoelectric drive type droplet ejection head is employed.

Further, in the three-dimensional shaped object manufacturing device 100, near the ejection section 15, a curing unit (not illustrated) for curing the bonding liquid is provided.

In the three-dimensional shaped object manufacturing device 100 having a configuration as explained above, damages such as friction of the squeegee 12, etc., can be detected easily, and therefore, a three-dimensional shaped object can be manufactured with high dimensional accuracy.

Particularly in a case in which the bonding liquid is ejected by an inkjet method as described later to cure the three-dimensional shaping composition to thereby form a unit layer 2, when the height of the layer 1 from the reference position S changes due to friction of the squeegee 12, etc., the speed of the droplets landing on the layer 1 changes, affecting the rate of permeation of the bonding liquid. As a result, problems arise, such as the change in the adhesion between each of the unit layers 2 and a change in the color tone, etc., between the two unit layers 2.

Further, when the height of the layer 1 from the reference position S changes due to friction of the squeegee 12, etc., there were also problems in which the layer 1 interferes with the droplet ejection head of the ejection section 15, causing contamination of the droplet ejection head with the three-dimensional shaping composition, or damages of the layer 1 due to the interference.

However, according to the aforementioned three-dimensional shaped object manufacturing device 100, these problems can be easily solved.

In addition, the aforementioned explanation is directed to the case in which the squeegee 12 is employed as a layer forming unit, but the layer forming unit is not limited to a squeegee, and a roller can be employed, for example.

Further, the collection section 13 can be provided with a removal unit for removing the three-dimensional shaping composition adhered to the squeegee 12. As the removal unit, ultrasonic waves, wiping-off, static electricity, etc., can be employed.

2. Manufacturing Method of Three-Dimensional Shaped Object

The method for manufacturing the three-dimensional shaped object of this embodiment is a manufacturing method using such a three-dimensional shaped object manufacturing device 100 as described above.

Specifically, a three-dimensional shaped object is manufactured in the following manner. First, a three-dimensional shaping composition is supplied to the supply area 111 using a supply unit 112 (Supplying process).

Next, the three-dimensional shaping composition supplied to the supply area 111 is conveyed to the shaping stage 102 by the squeegee 12, and a layer 1 is formed (Layer forming process).

A thickness of the layer 1 is not especially limited, but it is preferably 30 μm to 500 μm, and more preferably 70 μm to 150 μm. With this, occurrence of unintentional unevenness can be effectively prevented while making the productivity of the three-dimensional shaped object sufficiently excellent, which can make the dimensional accuracy of the three-dimensional shaped object particularly excellent.

The excessive three-dimensional shaping composition is collected in the collection section 13 after the formation of the layer 1 (Collecting Process). Afterward, the squeegee 12 is moved to the position above the distance detecting unit 14.

Next, the shaping section 10 in which the layer 1 was formed is moved in the X-axis direction, and a bonding liquid is ejected to the layer 1 in the drawing area of the ejection section 15 (Ejection Process). Then, the bonding liquid is cured by a curing unit that is not illustrated, and a unit layer 2 and an uncured section 3 are formed (Curing Process).

When the layer 1 is being subjected to the ejection process and the curing process, a distance from the reference position S to the squeegee 12 is detected using the distance detecting unit 14 (Distance detecting process). The detection result is transmitted to a control section that is not illustrated.

After that, the shaping stage 102 is lowered in the Z-axis direction by the amount of the thickness of the layer 1 to be formed, and each of the aforementioned process are sequentially repeated. With this, a three-dimensional shaped object is formed. The three-dimensional shaped object manufactured in the aforementioned manner has especially high dimensional accuracy.

3. Second Embodiment of Three-Dimensional Shaped Object Manufacturing Device

Next, a second embodiment of the three-dimensional shaped object manufacturing device of the present invention will be described.

Figure 3:
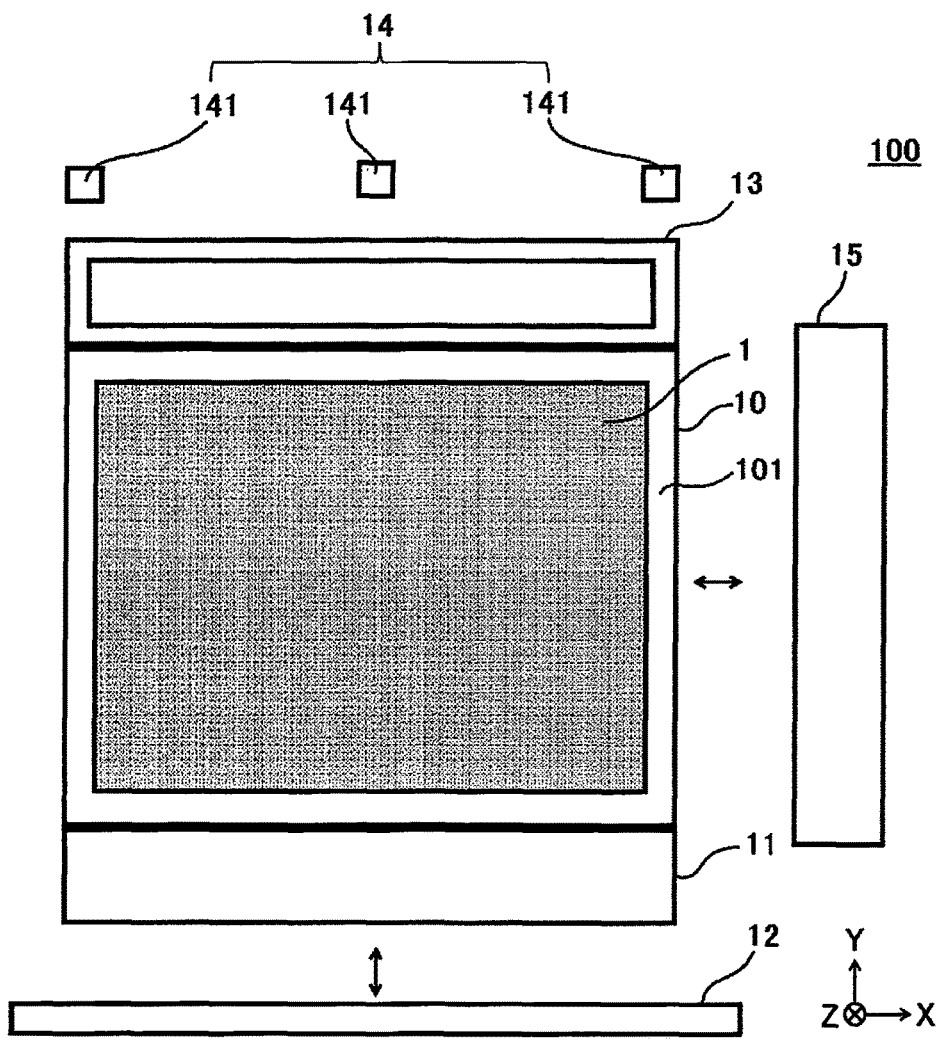
FIG. 3 is a plan view showing a second embodiment of a three-dimensional shaped object manufacturing device of the present invention viewed from above.

FIG. 3 is a plan view showing a second embodiment of a three-dimensional shaped object manufacturing device of the present invention viewed from above.

Hereinafter, the second embodiment will be explained, focusing on the differences from the embodiment explained above, and the explanations for similar items are omitted. Further, the same symbols are allotted to the structures similar to those of the aforementioned embodiment.

As shown in FIG. 3, the three-dimensional shaped object manufacturing device 100 according to this embodiment is equipped with three contactless-type laser sensors 141 arranged in the X-axis direction (the longitudinal direction of the squeegee 12), and other than that, it is similar to the aforementioned embodiment in structure.

In this way, according to the three-dimensional shaped object manufacturing device 100 of this embodiment, friction, etc., of the squeegee 12 can be easily detected from the distance information detected by each laser sensor 141.

4. Third Embodiment of Three-Dimensional Shaped Object Manufacturing Device

Next, a third embodiment of a three-dimensional shaped object manufacturing device of the present invention will be described.

Figure 4:
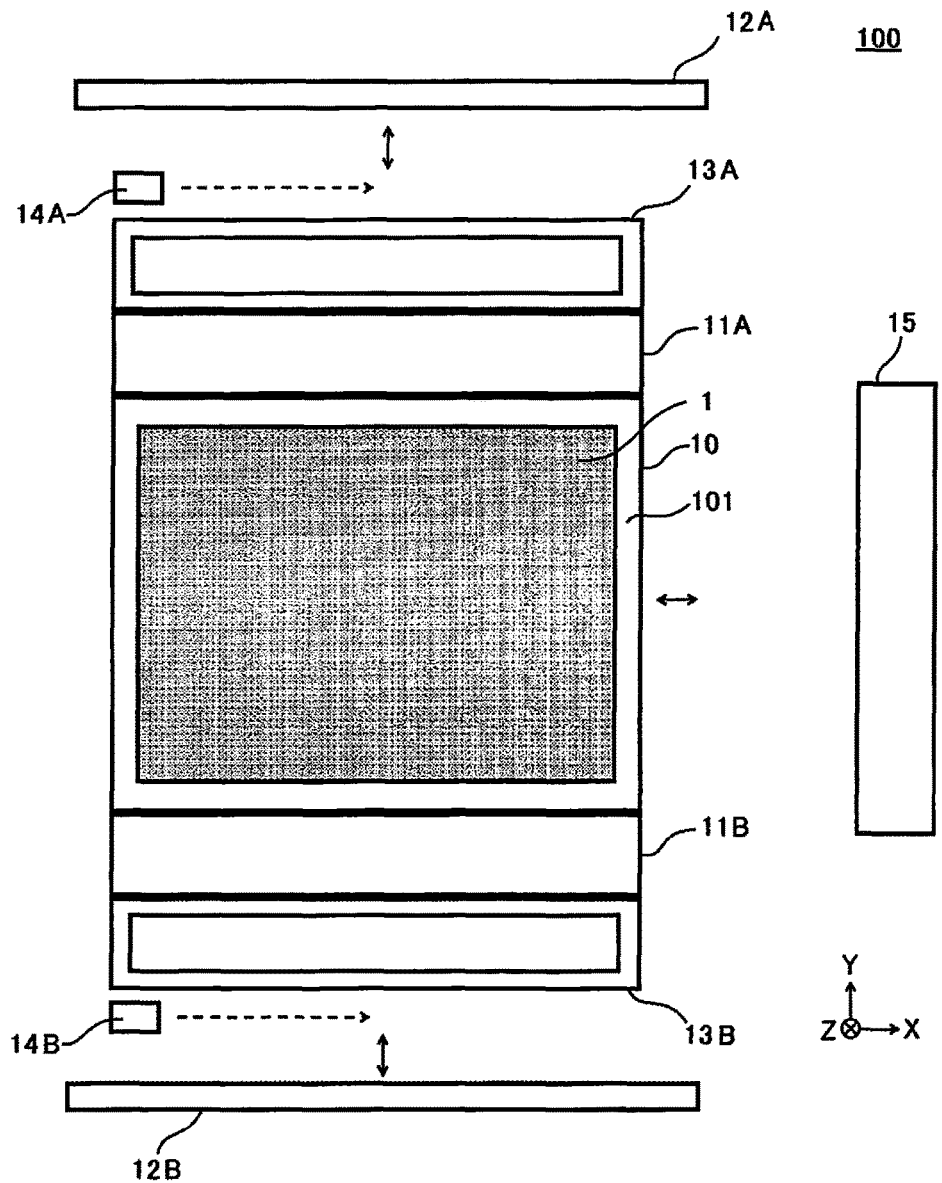
FIG. 4 is a plan view showing a third embodiment of a three-dimensional shaped object manufacturing device of the present invention viewed from above.

FIG. 4 is a plan view showing a third embodiment of a three-dimensional shaped object manufacturing device of the present invention viewed from above.

Hereinafter, the third embodiment will be explained, focusing on the differences from the embodiment explained above, and the explanations for similar items are omitted. Further, the same symbols are allotted to the structures similar to those of the aforementioned embodiment.

As shown in FIG. 4, the three-dimensional shaped object manufacturing device 100 according to this embodiment includes a shaping section 10, a supply section 11A and a supply section 11B on both sides of the shaping section 10 in the Y-axis direction, a collection section 13A and a collection section 13B in contact with the supply section 11A and the supply section 11B, respectively, and a contact-type distance detecting unit 14A and distance detecting unit 14B.

Further, the three-dimensional shaped object manufacturing device 100 according to this embodiment includes two layer forming units that move in the Y-axis direction, a squeegee 12A, and a squeegee 12B. Further, an ejection section 15 is provided on the X-axis direction side of the shaping section 10.

In the three-dimensional shaped object manufacturing device 100 having such a configuration, for example, after forming the three-dimensional shaping composition supplied to the supply section 11A into a layer 1 by the squeegee 12A in the shaping section 10, the shaping section 10 is moved to the drawing area of the ejection section 15, the bonding liquid is ejected to the layer 1, and the bonding liquid is cured.

While the bonding liquid is ejected and cured, the three-dimensional shaping composition is supplied to the supply section 11B and the formation of the layer 1 using the squeegee 12B is prepared.

Furthermore, while the bonding liquid is ejected and cured, the state of the tip end of the squeegee 12A is detected using the distance detecting unit.

In this way, according to the three-dimensional shaped object manufacturing device 100 of this embodiment, the layer 1 can be formed from both directions, and as a result, the productivity of the three-dimensional shaped object is improved.

5. Fourth Embodiment of Three-Dimensional Shaped Object Manufacturing Device Next, a fourth embodiment of the three-dimensional shaped object manufacturing device of the present invention will be described.

Figure 5:
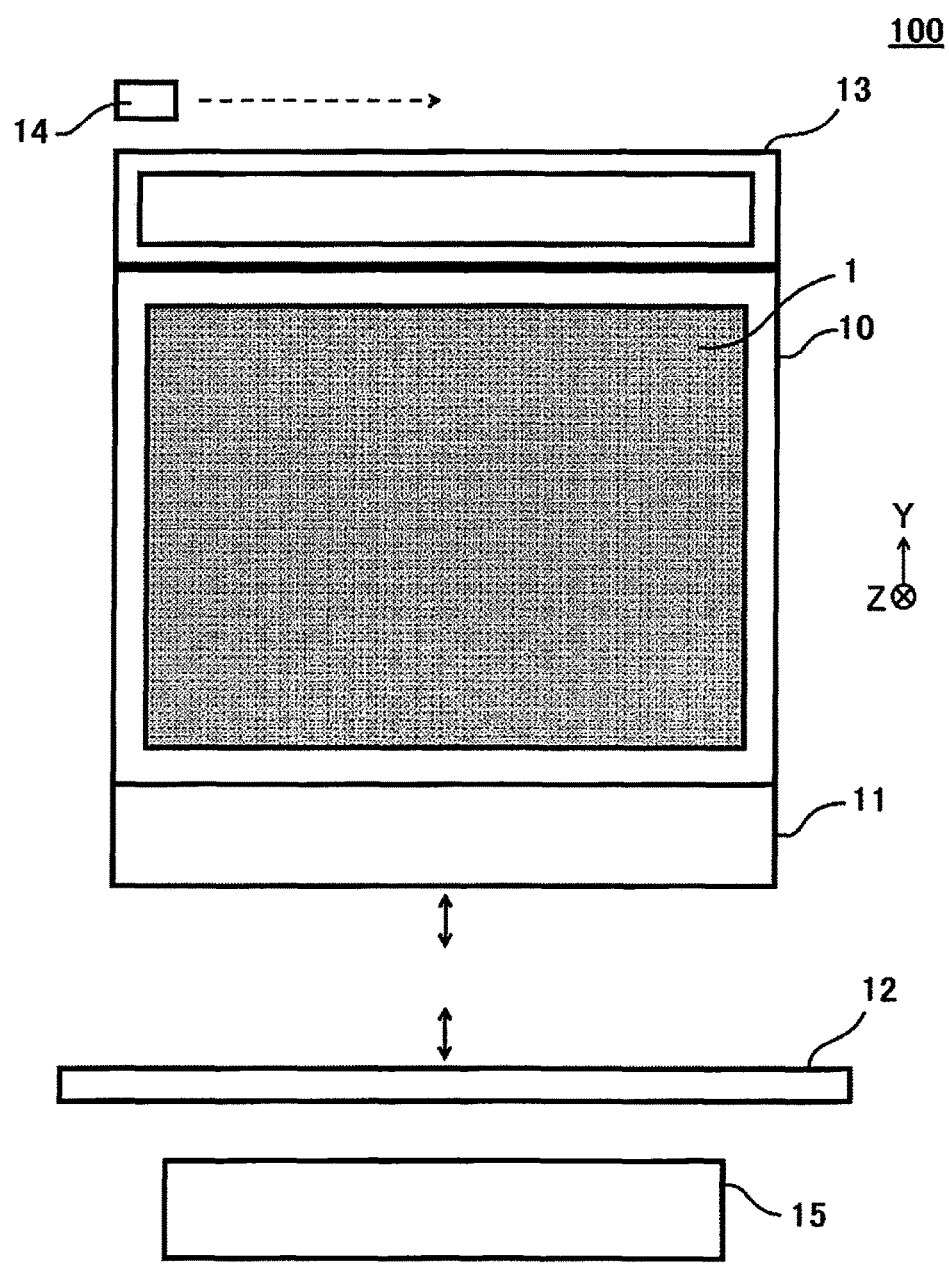
FIG. 5 is a plan view showing a fourth embodiment of a three-dimensional shaped object manufacturing device of the present invention viewed from above.

FIG. 5 is a plan view showing a fourth embodiment of a three-dimensional shaped object manufacturing device of the present invention viewed from above.

Hereinafter, the fourth embodiment will be explained, focusing on the differences from the embodiment explained above, and the explanations for similar items are omitted. Further, the same symbols are allotted to the structures similar to those of the aforementioned embodiment.

The three-dimensional shaped object manufacturing device 100 according to this embodiment, as shown in FIG. 5, is different from the aforementioned first embodiment in that the moving direction of the squeegee 12 and the moving direction of the shaping section 10 are both in the Y-axis direction and further, the ejection section 15 is installed in the Y-axis direction of the shaping section 10.

Such a three-dimensional shaped object manufacturing device 100, as shown in FIG. 5, has a configuration in which a shaping section 10, a supply section 11, a squeegee 12, a collection section 13, a distance detecting unit 14, and an ejection section 15 are arranged in the Y-axis direction. Further, the shaping section 10 and the supply section 11 are integrally formed, and the supply section 11 is configured to move along with the movement of the shaping section 10.

According to such a configuration, the bonding liquid can be ejected to the layer 1 from the ejection section 15 immediately after the formation of the layer 1, so the unit layer 2 can be formed efficiently.

6. Three-Dimensional Shaping Composition

Next, a three-dimensional shaping composition will be described in detail.

The three-dimensional shaping composition includes three-dimensional shaping powder. The three-dimensional shaping composition of this embodiment includes three-dimensional shaping powder and water-soluble resin.

Hereinafter, each component will be described in detail.

Three-Dimensional Shaping Powder

The three-dimensional shaping powder is constituted by a plurality of particles.

As the particles, any particle can be used, but particles that are porous (porous particles) are preferred. With this, when manufacturing a three-dimensional shaped object, the bonding agent in the bonding liquid can be appropriately penetrated inside the pores, and as a result, it can be suitably used for manufacturing three-dimensional shaped objects with excellent mechanical strength.

For the structural materials of the porous particles constituting the three-dimensional shaping powder, for example, inorganic materials, organic materials, their compound materials, etc., can be exemplified.

As the inorganic materials constituting the porous particles, for example, various metals, various metal compounds, etc., are exemplified. As the metal compounds, for example, the following are exemplified: various metal oxides such as silica, alumina, titanium oxide, zinc oxide, zircon oxide, tin oxide, magnesium oxide, potassium titanate, etc.; various metal hydroxides such as magnesium hydroxide, aluminum hydroxide, calcium hydroxide, etc.; various metal nitrides such as, silicon nitride, titanium nitride, aluminum nitride, etc.; various metal carbides such as silicon carbide, titanium carbide, etc.; various metal sulfides such as zinc sulfide, etc.; various metal carbonates such as calcium carbonate, magnesium carbonate, etc.; various metal hydrosulfates such as calcium sulfate, magnesium sulfate, etc.; various metal silicates such as calcium silicate, magnesium silicate, etc.; various metal phosphates such as calcium phosphate, etc.; various metal borates such as aluminum borate, magnesium borate, etc., combination of these compounds, etc.

As the organic materials constituting the porous particles, for example, the following are exemplified: synthetic resin, natural polymer, etc., and more specifically, the followings are exemplified: polyethylene resin; polypropylene; polyethylene oxide; polypropylene oxide; polyethylenimine; polystyrene; polyurethane; polyuria; polyester; silicone resin; acrylic silicone resin; polymer including (meth) acrylicacidester such as polymethylmethacrylate, etc. as a constituent monomer; cross polymer including (meth) acrylicacidester such as methylmethacrylate crosspolymer, etc. as a constituent monomer (ethylene acrylic acid copolymer resin, etc.); polyamide resin such as Nylon 12, Nylon 6, copolymer nylon, etc.; polyimide; carboxymethyl cellulose; gelatin; starch; chitin; chitosan, etc.

Among them, it is preferable that the porous particles are composed of inorganic materials, more preferably composed of metal oxides, and even more preferably composed of silica. With this, the mechanical strength, the light resistance, etc., of the three-dimensional shaped object can be made particularly excellent. Also, particularly, when the porous particles are composed of silica, the aforementioned effects are more remarkably demonstrated. Further, since silica has excellent fluidity, it has an advantage for forming a layer 1 having higher thickness uniformity, and the productivity and dimensional accuracy of the three-dimensional shaped object can be made particularly excellent.

As silica, commercially available silica can be used. Specifically, for example, the following can be exemplified: Mizukasil P-526, Mizukasil P-801, Mizukasil NP-8, Mizukasil P-802, Mizukasil P-802Y, Mizukasil C-212, Mizukasil P-73, Mizukasil P-78A, Mizukasil P-78F, Mizukasil P-87, Mizukasil P-705, Mizukasil P-707, Mizukasil P-707D, Mizukasil P-709, Mizukasil C-402, Mizukasil C-484 (the aforementioned products made by Mizusawa Chemical Industry Co., Ltd.), Tokusil U, Tokusil UR, Tokusil GU, Tokusil AL-1, Tokusil GU-N, Tokusil N, Tokusil NR, Tokusil PR, Saw Rex, Fine seal E-50, Fine seal T-32, Fine Seal X-30, Fine Seal X-37, Fine Seal X-37B, Fine Seal X-45, Fine Seal X-60, Fine Seal X-70, Fine seal RX-70, Fine seal A, Fine seal B (the aforementioned products made by Tokuyama Corporation), Sipernat, Carplex FPS-101, Carplex CS-7, Carplex 22S, Carplex 80, Carplex 80D, Carplex XR, Carplex 67 (the aforementioned products made by DSL. Japan Ltd.), Syloid 63, Syloid 65, Syloid 66, Syloid 77, Syloid 74, Syloid 79, Syloid 404, Syloid 620, Syloid 800, Syloid 150, Syloid 244, Syloid 266 (the aforementioned products made by Fuji Silysia Chemical Co., Ltd.), Nippujeru AY-200, Nippujeru AY-6A2, Nippujeru AZ-200, Nippujeru AZ-6A0, Nippujeru BY-200, Nippujeru BY-200, Nippujeru CX-200, Nippujeru CY-200, Nipseal E-150J, Nipseal E-220A, Nipseal E-200A (the aforementioned products made by Tosoh Silica Co., Ltd.), etc.

Further, it is preferable that the porous particles are subjected to a hydrophobic treatment. In general, the bonding agent included in the bonding liquid has a tendency to have hydrophobic property. Therefore, since the porous particles are subjected to the hydrophobic treatment, the bonding agent can be appropriately penetrated inside the porous particles. As a result, anchor effect is remarkably demonstrated, and the mechanical strength of the three-dimensional shaped object to be obtained can be further excellent. Also, when the porous particles are subjected to the hydrophobic treatment, it can be suitably reused. To explain in more detail, when the porous particles are subjected to the hydrophobic treatment, affinity of the water-soluble resin, which will be described later, and the porous particles is deteriorated, so it is prevented from penetrating inside the pores. As a result, in the manufacturing of the three-dimensional shaped object, the porous particles in the region where the bonding liquid was not applied can be collected in high purity because impurities are easily removed by washing by water, etc. Therefore, by mixing the collected three-dimensional shaping powder with the water-soluble resin, etc. in a predetermined ratio again, three-dimensional shaping powder that is surely controlled to be the desired compound can be obtained.

The hydrophobic treatment applied to the porous particles constituting three-dimensional shaping powder can be any process for enhancing the hydrophobic, but it is preferable that it introduces the hydrocarbon group. Consequently, the hydrophobic property of the particles can be enhanced. Also, the uniformity of the degree of the hydrophobic treatment in each particle or each section (including the surface inside the pores) of the particle surface can be easily and surely enhanced.

As a compound used for the hydrophobic treatment, a silane compound including a silyl group is preferred. As a specific example of the compounds that can be used for the hydrophobic treatment, for example, the followings are exemplified: hexamethyldisilazane, dimethyldimethoxysilane, diethyldiethoxysilane, 1-propenylmethyldichlorosilane, propyldimethylchlorosilane, propylmethyldichlorosilane, propyltrichlorosilane, propyltriethoxysilane, propyltrimethoxysilane, styrylethyltrimethoxysilane, tetradecyltrichlorosilane, 3-thiocyanatepropyltriethoxysilane, p-tolyldimethylchlorosilane, p-tolylmethyldichlorosilane, p-tolyltrichlorosilane, p-tolyltrimethoxysilane, p-tolyltriethoxysilane, di-n-propyldi-n-propoxysilane, diisopropyldiisopropoxysilane, di-n-butyldi-n-butyroxysilane, di-sec-butyldi-sec-butyroxysilane, di-t-butyldi-t-butyroxysilane, octadecyltrichlorosilane, octadecylmethyldiethoxysilane, octadecyltriethoxysilane, octadecyltrimethoxysilane, octadecyldimethylchlorosilane, octadecylmethyldichlorosilane, octadecylmethoxydichlorosilane, 7-octenyldimethylchlorosilane, 7-octenyltrichlorosilane, 7-octenyltrimethoxysilane, octylmethyldichlorosilane, octyldimethylchlorosilane, octyltrichlorosilane, 10-undecenyldimethylchlorosilane, undecyltrichlorosilane, vinyldimethylchlorosilane, methyloctadecyldimethoxysilane, methyldodecyldiethoxysilane, methyloctadecyldimethoxysilane, methyloctadecyldiethoxysilane, n-octylmethyldimethoxysilane, n-octylmethyldiethoxysilane, triacontyldimethylchlorosilane, triacontyltrichlorosilane, methyltrimethoxysilane, methyltriethoxysilane, methyltri-n-propoxysilane, methylisopropoxysilane, methyl-n-butyroxysilane, methyltri-sec-butyroxysilane, methyltri-t-butyroxysilane, ethyltrimethoxysilane, ethyltriethoxysilane, ethyltri-n-propoxysilane, ethylisopropoxysilane, ethyl-n-butyroxysilane, ethyltri-sec-butyroxysilane, ethyltri-t-butyroxysilane, n-propyltrimethoxysilane, isobutyl trimethoxysilane, n-hexyltrimethoxysilane, hexadecyltrimethoxysilane, n-octyltrimethoxysilane, n-dodecyltrimethoxysilane, n-octadecyltrimethoxysi lane, n-propyltriethoxysilane, isobutyltriethoxysilane, n-hexyltriethoxysilane, hexadecyltriethoxysilane, n-octyltriethoxysilane, n-dodecyltrimethoxysilane, n-octadecyltriethoxysilane, 2-[2-(trichlorosilyl)ethyl]pyridine, 4-[2-(trichlorosilyl)ethyl]pyridine, diphenyldimethoxysilane, diphenyldiethoxysilane, 1,3-(trichlorosilyl methyl) heptacosane, dibenzyldimethoxysilane, dibenzyldiethoxysilane, phenyltrimethoxysilane, phenylmethydimethoxysilane, phenyldimethylmethoxysilane, phenyldimethoxysilane, phenyldiethoxysilane, phenylmethyldiethoxysilane, phenyldimethylethoxysilane, benzyltriethoxysilane, benzyltrimethoxysilane, benzylmethyldimethoxysilane, benzyldimethylmethoxysilane, benzyldimethoxysilane, benzyldiethoxysilane, benzylmethyldiethoxysilane, benzyldimethylethoxysilane, benzyltriethoxysilane, dibenzyldimethoxysilane, dibenzylethoxysilane, 3-acetoxypropyl-trimethoxysilane, 3-acryloxypropyl-trimethoxysilane, allyltrimethoxysilane, allyltriethoxysilane, 4-amino-butyl triethoxysilane, (aminoethyl aminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexyl aminopropyl)trimethoxysilane, p-aminophenyltrimethoxysilane, p-aminophenylethoxysilane, m-aminophenyltrimethoxysilane, m-aminophenylethoxysilane, 3-aminopropyltrimethoxysilane, 3-aminopropyltriethoxysilane, ω-aminoundecyltrimethoxysilane, amyltriethoxysilane, benzooxasilepindimethylester, 5-(bicycloheptenyl)triethoxysilane, bis(2-hydroxyethyl)-3-aminopropyltriethoxysilane, 8-bromo-octyltrimethoxysilane, bromophenyltrimethoxysilane, 3-bromo-propyltrimethoxysilane, n-butyltrimethoxysilane, 2-chloro-methyltriethoxysilane, chloromethylmethyldiethoxysilane, chloromethylmethyldiisopropoxysilan, p-(chloromethyl)phenyltrimethoxysilane, chloromethyltriethoxysilane, chlorophenyltriethoxysilane, 3-chloropropylmethyldimethoxysilane, 3-chloropropyltriethoxysilane, 3-chloropropyltrimethoxysilane, 2-(4-chloro-sulfonylphenyl)ethyltrimethoxysilane, 2-cyano-ethyltriethoxysilane, 2-cyano-ethyltrimethoxysilane, cyanomethylphenethyltriethoxysilane, 3-cyano-propyltriethoxysilane, 2-(3-cyclohexenyl)ethyltrimethoxysilane, 2-(3-cyclohexenyl)ethyl triethoxysilane, 3-cyclohexenyltrichlorosilane, 2-(3-cyclohexenyl)ethyltrichlorosilane, 2-(3-cyclohexenyl) ethyldimethylchlorosilane, 2-(3-cyclohexenyl) ethylmethyldichlorosilane, cyclohexyldimethylchlorosilane, cyclohexylethyldimethoxysilane, cyclohexylmethyldichlorosilane, cyclohexylmethyldimethoxysilane, (cyclohexyl methyl)trichlorosilane, cyclohexyltrichlorosilane, cyclohexyltrimethoxysilane, cyclooctyltrichlorosilane, (4-cyclooctenyl)trichlorosilane, cyclopentyltrichlorosilane, cyclopentyltrimethoxysilane, 1,1-diethoxy-1-silacyclopenta-3-ene, 3-(2,4-dinitrophenylamino)propyl triethoxysilane, dimethylchlorosilyl)methyl-7,7-dimethylnorpinane, (cyclohexyl aminomethyl)methyldiethoxysilane, (3-cyclopentadienyl propyl)triethoxysilane, N, N-diethyl-3-aminopropyl) trimethoxysilane, 2-(3,4-epoxy cyclohexyl)ethyltrimethoxysilane, 2-(3,4-epoxy cyclohexyl)ethyltriethoxysilane, (furfuryl oxymethyl)triethoxysilane, 2-hydroxy-4-(3-ethoxy propoxy)diphenylketone, 3-(p-methoxyphenyl)propylmethyldichlorosilane, 3-(p-methoxyphenyl)propyltrichlorosilane, p-(methylphenethyl)methyldichlorosilane, p-(methylphenethyl)trichlorosilane, p-(methylphenethyl) dimethylchlorosilane, 3-morpholinopropyltrimethoxysilane, (3-glycidoxypropyl)methyldiethoxysilane, 3-glycidoxypropyltrimethoxysilane, 2,3,4,7,7,-hexachloro-6-methyldiethoxysilyl-2-norbornene, 1,2,3,4,7,7,-hexachloro-6-triethoxysilyl-2-norbornene, 3-iodopropyltrimethoxysilane, 3-isocyanatepropyltriethoxysilane, (mercaptomethyl)methyldiethoxysilane, 3-mercaptopropylmethyldimethoxysilane, 3-mercaptopropyldimethoxysilane, 3-mercaptopropyltriethoxysilane, 3-methacryloxypropylmethyldiethoxysilane, 3-methacryloxypropyltrimethoxysilane, methyl{2-(3-trimethoxysilyl propyl-amino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyl trimethoxysilane, phenethylmethyldimethoxysilane, phenethyldimethylmethoxysilane, phenethyldimethoxysilane, phenethyldiethoxysilane, phenethylmethyldiethoxysilane, phenethyldimethylethoxysilane, phenethyltrimethoxysilane, (3-phenylpropyl)dimethylchlorosilane, (3-phenylpropyl)methyldichlorosilane, N-phenylaminopropyltrimethoxysilane, N-(triethoxysilyl propyl) dansylamide, N-(3-triethoxysilylpropyl)-4,5-dihydroimidazole, 2-(triethoxysilylethyl)-5-(chloroacetoxymethyl) bicycloheptane, (S)—N-triethoxysilylpropyl-O-mentcarbamate, 3-(triethoxysilylpropyl)-p-nitrobenzamide, 3-(triethoxysilyl)propylsuccinate anhydride, N-[5-(trimethoxysilyl)-2-aza-1-oxo-pentyl]caprolactam, 2-(trimethoxysilylethyl)pyridine, N-(trimethoxysilylethyl) benzyl-N,N,N-trimethylammoniumchloride, phenylvinyldiethoxysilane, 3-thiocyanate-propyltriethoxysilane, (toridecafluoro1,1,2,2,-tetrahydro-octyl)triethoxysilane, N-{3-(triethoxysilyl)propyl}phthalamic acid, (3,3,3-trifluoropropyl)methyldimethoxysilane, (3,3,3-trifluoro-propyl) trimethoxysilane, 1-trimethoxysilyl-2-(chloromethyl) phenylethane, 2-(trimethoxysilyl)ethylphenylsulfonylazide, β-trimethoxysilylethyl-2-pyridine, trimethoxysilylpropyldiethylenetriamine, N-(3-trimethoxysilylpropyl)pyrrole, N-trimethoxysilylpropyl-N,N,N-tributylammoniumbromide, N-trimethoxysilylpropyl-N,N,N-tributylammoniumchloride, N-trimethoxysilylpropyl-N,N,N-trimethylammoniumchloride, vinylmethyldiethoxysilane, vinyltriethoxysilane, vinyltrimethoxysilane, vinylmethyldimethoxysilane, vinyldimethylmethoxysilane, vinyldimethylethoxysilane, vinylmethyldichlorosilane, vinylphenyldichlorosilane, vinylphenyldiethoxysilane, vinylphenyldimethylsilane, vinylphenylmethylchlorosilane, vinyltriphenoxysilane, vinyltris-t-butoxysilane, adamantylethyltrichlorosilane, allylphenyl trichlorosilane, (aminoethylaminomethyl)phenethyltrimethoxysilane, 3-aminophenoxydimethylvinylsilane, phenyltrichlorosilane, phenyldimethyl chlorosilane, phenylmethyldichlorosilane, benzyltrichlorosilane, benzyldimethylchlorosilane, benzylmethyldichlorosilane, phenethyldiisopropylchlorosilane, phenethyltrichlorosilane, phenethyldimethylchlorosilane, phenethylmethyldichlorosilane, 5-(bicycloheptenyl)trichlorosilane, 5-(bicycloheptenyl)triethoxysilane, 2-(bicycloheptyl)dimethylchlorosilane, 2-(bicycloheptyl)trichlorosilane, 1,4-bis(trimethoxysilylethyl)benzene, bromophenyltrichlorosilane, 3-phenoxypropyldimethylchlorosilane, 3-phenoxypropyltrichlorosilane, t-butylphenylchlorosilane, t-butylphenylmethoxysilane, t-butylphenyldichlorosilane, p-(t-butyl)phenethyldimethylchlorosilane, p-(t-butyl) phenethyltrichlorosilane, 1,3(chlorodimethylsilylmethyl) heptacosane, ((chloromethyl)phenylethyl) dimethylchlorosilane, ((chloromethyl)phenylethyl) methyldichlorosilane, ((chloromethyl)phenylethyl) trichlorosilane, ((chloromethyl)phenylethyl) trimethoxysilane, chlorophenyltrichlorosilane, 2-cyanoethyltrichlorosilane, 2-cyanoethylmethyldichlorosilane, 3-cyanopropylmethyldiethoxysilane, 3-cyanopropylmethyldichlorosilane, 3-cyanopropylmethyldichlorosilane, 3-cyano-propyldimethylethoxysilane, 3-cyanopropylmethyldichlorosilane, 3-cyanopropyltrichlorosilane, fluorinated alkylsilane, etc., and it can be used by combining one or more selected from these compounds.

Among such compounds, hexamethyldisilazane is preferably employed for the hydrophobic treatment. With this, the hydrophobic property of the particles can be enhanced. Further, the uniformity of the degree of the hydrophobic treatment in each particle or each section (including the surface inside the pores) of the particle surface can be easily and surely enhanced.

When the hydrophobic treatment, in which the silane compound is used, is performed in the liquid phase, by immersing the particles to be subjected to the hydrophobic treatment in the liquid including silane compound, the desired reaction can be appropriately progressed and a chemical adsorption film of the silane compound can be formed.

Further, when the hydrophobic treatment in which the silane compound is used is performed in the gas phase, by exposing the particles to be subjected to the hydrophobic treatment to the vapor of the silane compound, the desired reaction can be appropriately progressed and a chemical adsorption film of the silane compound can be formed.

An average diameter of the particles constituting three-dimensional shaping powder is not particularly limited, but it is preferable 1 μm to 25 μm, and more preferably 1 μm to 15 μm. Consequently, the mechanical strength of the three-dimensional shaped object can be made particularly excellent, and occurrence of the unintentional unevenness, etc., in the manufactured three-dimensional shaped object can be prevented more effectively, and as a result, the dimensional accuracy of the three-dimensional shaped object can be made particularly excellent. Further, the fluidity of three-dimensional shaping powder, and the fluidity of the three-dimensional shaping composition including three-dimensional shaping powder can be made particularly excellent, and the productivity of the three-dimensional shaped object can be made particularly excellent. In the present invention, the average diameter refers to the volume-based average diameter, which can be measured, for example, by adding a sample to methanol, and measuring the dispersion liquid dispersed in the ultrasonic disperser for 3 minutes by a coulter-counter method particle size distribution measurement device (TA-II TYPE made by COULTER ELECTRONICS INS) using 50 μm aperture.

Dmax of the particles constituting three-dimensional shaping powder is preferably 3 μm to 40 μm, and more preferably 5 μm to 30 μm. With this, the mechanical strength of the three-dimensional shaped object can be made particularly excellent, and occurrence of the unintentional unevenness, etc., in the manufactured three-dimensional shaped object can be prevented more effectively, and as a result, the dimensional accuracy of the three-dimensional shaped object can be made particularly excellent. Further, the fluidity of the three-dimensional shaping powder, and the fluidity of the three-dimensional shaping composition including three-dimensional shaping powder can be made particularly excellent, and the productivity of the three-dimensional shaped object can be made particularly excellent. Further, the scattering of light caused by the particles on the surface of the three-dimensional shaped object to be manufactured can be more effectively prevented.

When the particles are porous particles, the porosity of the porous particles is preferably equal to or more than 50%, and more preferably 55% to 90%. With this, there are sufficient spaces (pores) in which the bonding agent can penetrate, and the mechanical strength of the porous particles itself can be made excellent, and as a result, the mechanical strength of the three-dimensional shaped object in which the bonded resin was entered in the pores can be made particularly excellent. Further, in the present invention, the porosity of a particle is the ratio of pores (volume ratio) which exists inside the particles to the apparent volume of the particles, and when a density of a particle is defined as $\rho(g/cm^3)$, and when a real density of a constituent material of a particle is defined as $\rho_0(g/cm^3)$, the value is represented by $\{(\rho_0-\rho)/\rho_0\}\times100$.

When the particles are porous particles, the average hole diameter (pore diameter) of the porous particles is preferably equal to or more than 10 nm, and more preferably 50 nm to 300 nm. With this, the mechanical strength of the three-dimensional shaped object that is finally obtained can be made particularly excellent. Further, in a case that a colored bonding liquid including a pigment is used for manufacturing the three-dimensional shaped object, the pigment can be appropriately retained in the pores of the porous particles.

Therefore, the unintentional spreading of pigments can be prevented, which enables assured formation of a high-resolution image.

The particles constituting the three-dimensional shaping powder may have any shape, but it is preferably formed in a spherical shape. With this, the fluidity of three-dimensional shaping powder and the fluidity of the three-dimensional shaping composition including the three-dimensional shaping powder can be made particularly excellent, and the productivity of the three-dimensional shaped object can be made particularly excellent. Also, occurrence of the unintentional unevenness, etc., in the three-dimensional shaped object to be manufactured can be prevented, and as a result, the dimensional accuracy of the three-dimensional shaped object can be made particularly excellent.

The three-dimensional shaping powder may include plural types of particles in which the aforementioned conditions (e.g., a constituent material of the aforementioned particles, a type of the hydrophobic treatment, etc.) are different from each other.

The porosity of the three-dimensional shaping powder is preferably 70% to 98%, and more preferably 75% to 97.7%. With this, the mechanical strength of the three-dimensional shaped object that is finally obtained can be made particularly excellent. Further, the fluidity of three-dimensional shaping powder and the fluidity of the three-dimensional shaping composition including three-dimensional shaping powder can be made particularly excellent, and the productivity of the three-dimensional shaped object can be made particularly excellent. Also, occurrence of the unintentional unevenness, etc., in the three-dimensional shaped object to be manufactured can be prevented, and as a result, the dimensional accuracy of the three-dimensional shaped object can be made particularly excellent. Further, in the present invention, the porosity of three-dimensional shaping powder, in a case in which the three-dimensional shaping powder is filled in a predetermined volume (e.g., 100 mL) of a container, refers to the ratio of a sum of the volume of the holes provided in the entire particles constituting the three-dimensional shaping powder and the volume of the spaces existed among the particles to the volume of the aforementioned container. When a bulk density of the three-dimensional shaping powder is defined as $P(g/cm^3)$, and when a real density of a constituent material of the three-dimensional shaping powder is defined as $P_0(g/cm^3)$, the value is represented by $\{(P_0-P)/P_0\}\times100$.

A content ratio of three-dimensional shaping powder in the three-dimensional shaping composition is preferably 15 mass % to 90 mass %, and more preferably 10 mass % to 58 mass %. With this, the fluidity of the three-dimensional shaping composition can be made sufficiently excellent, and the mechanical strength of the three-dimensional shaped object to be finally obtained can be made particularly excellent.

Water-Soluble Resin

The three-dimensional shaping composition includes a plurality of particles and a water-soluble resin. Since the water-soluble resin is included, the particles can be bonded (temporarily fixed) to each other, and the particles can be effectively prevented from spreading unintentionally, etc. With this, the safety of the operator and the dimensional accuracy of the manufactured three-dimensional shaped object can be improved.

In this specification, the water-soluble resin may be any resin in which at least a part of the resin is soluble in water, but for example, the solubility with respect to water at 25° C. (soluble mass in 100 g of water) is preferable to be 5 (g/100 g water) or more, and more preferably 10 (g/100 g water) or more.

As the water-soluble resin, for example, the following are exemplified: synthetic polymers such as polyvinyl alcohol (PVA), polyvinylpyrrolidone (PVP), sodium polyacrylate, polyacrylamide, modified polyamide, polyethylenimine, polyethylene oxide, etc., natural polymers such as cornstarch, mannan, pectin, agar, alginic acid, dextran, glue, gelatin, etc., semi-synthetic polymers such as carboxymethyl cellulose, hydroxyethyl cellulose, oxidized starch, modified starches, etc. It can be used by combining one or more selected from these compounds.

As an example of a water-soluble resin product, for example, the following can be exemplified: methylcellulose (trade name "METOLOSE SM-15" made by Shin-Etsu Chemical Co., Ltd.), hydroxyethylcellulose (trade name "AL-15" made by Fuji Chemical Co., Ltd), hydroxypropyl cellulose (trade name "HPC-M" mad by Nippon Soda Co., Ltd.), carboxymethylcellulose (trade name "CMC-30" made by Nichirin Chemical Co., Ltd.), sodium starch phosphate ester (I) (trade name "HOSUTA 5100" made by Matsutani Chemical Industry Co., Ltd.), polyvinylpyrroidone (trade name "PVP K-90" made by Tokyo Chemical Industry Co., Ltd.), methylvinylether/maleic anhydride copolymer (trade name "AN-139" made by GAF Gauntlet Co., Ltd.), polyacrylamide (Wako Pure Chemical Industries, Ltd.), modified polyamide (modified nylon)(trade name "AQ NYLON" made by Toray Industries, Inc.), polyethylene oxide (trade name "PEO-1" made by Stell Chemical Co., Ltd., trade name "Al Cox" made by Meisei Chemical Industry Co., Ltd.), ethylene oxide/propylene oxide random copolymer (trade name "Al Cox EP" made by Meisei Chemical Industry Co., Ltd.), sodium polyacrylate (Wako Pure Chemical Industries, Ltd.), carboxy vinyl polymer/cross-linked acrylic water-soluble resin (trade name "AQUPEC" made by Sumitomo Seika Chemicals Co., Ltd.), etc.

Among such products, in a case in which the water-soluble resin is polyvinyl alcohol, the mechanical strength of the three-dimensional shaped object can be made particularly excellent. Further, by adjusting saponification or degree of polymerization, the properties of the water-soluble resin (e.g., water solubility, water resistance, etc.) or the properties of the three-dimensional shaping composition (e.g., viscosity, fixing force of the particles, wettability, etc.) can be appropriately controlled. Therefore, various manufacturing methods of the three-dimensional shaped object can be more appropriately handled. Further, among the various water-soluble resins, polyvinyl alcohol is low cost and has supply stability. Therefore, the production cost is suppressed and the manufacturing of the three-dimensional shaped object can be stably performed.

In a case in which the water-soluble resin includes polyvinyl alcohol, saponification of polyvinyl alcohol is preferably 85 to 90. In this case, the solubility of polyvinyl alcohol to water can be suppressed. Therefore, in a case in which the three-dimensional shaping composition includes water, the decrease in adhesiveness between the adjacent unit layers 2 can be effectively suppressed.

In a case in which the water-soluble resin includes polyvinyl alcohol, the degree of the polymerization of polyvinyl alcohol is preferably 300 to 1000. In this case, when the three-dimensional shaping composition includes water, the mechanical strength of each unit layer 2 and the adhesiveness between the adjacent unit layers 2 can be made particularly excellent.

When the water-soluble resin is polyvinylpyrroidone (PVP), the following effects are obtained. That is, since polyvinylpyrroidone has excellent adhesiveness to various materials such as glass, metals, plastics, etc., the strength and the shape stability in the part of layers where the ink is not applied are particularly excellent, and the dimensional accuracy of the three-dimensional shaped object to be finally obtained can be made particularly excellent. Further, since polyvinylpyrroidone has high-solubility with respect to various organic solvents, the fluidity of the three-dimensional shaping composition can be made particularly excellent, and the layers 1 in which unintentional uneven thickness is more effectively prevented can be appropriately formed, and the dimensional accuracy of the three-dimensional shaped object to be finally obtained can be made particularly excellent. Further, since polyvinylpyrroidone has high-solubility to water, in the unattached particle removal process (after the object formation is completed), among the particles constituting each layer 1, the particles that are not bonded by the bonding agent can be easily and surely removed. Further, since polyvinylpyrroidone has appropriate affinity with the three-dimensional shaping powder, it hardly penetrates inside the aforementioned pores, and on the other hand, the wettability to the surface of the particles is relatively high. Therefore, the aforementioned temporarily fixing function can be more effectively demonstrated. Also, since polyvinylpyrroidone has excellent affinity to various coloring agents, when the bonding liquid including a coloring agent is used in the bonding liquid application process, unintentional spreading of the coloring agent can be effectively prevented. Further, since polyvinylpyrroidone has antistatic function, in a case in which powder that is not formed into paste is used as the three-dimensional shaping composition in the layer forming process, it can effectively prevent the powder from spreading. Further, in a case in which powder that is formed into paste is used as the three-dimensional shaping composition in the layer forming process, and in a case in which the paste type three-dimensional shaping composition includes polyvinylpyrroidone, it can effectively prevent bubbles from mixing into the three-dimensional shaping composition, and in the layer forming process, it can effectively prevent defects from occurring due to mixing the bubbles.

When the water-soluble resin includes polyvinylpyrroidone, the weight-average molecular weight of polyvinylpyrroidone is preferably 10,000 to 1,700,000, and more preferably, 30000 to 1500000. Therefore, the aforementioned function can be effectively demonstrated.

In the three-dimensional shaping composition, the water-soluble resin is preferably formed in liquid form (e.g., dissolved state, molten state, etc.) at least in the layer forming process. In this case, the uniformity in the thickness of the layers 1 formed by using the three-dimensional shaping composition can be easily and surely enhanced.

The content ratio of the water-soluble resin in the three-dimensional shaping composition is preferably 15 vol. % or less, and more preferably, 2 vol. % to 5 vol. % with respect to the bulk volume of the three-dimensional shaping powder. In this case, the function of the aforementioned water-soluble resin is sufficiently demonstrated, and the spaces in which the bonding liquid penetrates can be widely secured and as a result, the mechanical strength of the three-dimensional shaped object 1 can be made particularly excellent.

Solvent

The three-dimensional shaping composition may include a solvent in addition to the aforementioned water-soluble resin and the three-dimensional shaping powder. In this case, the fluidity of the three-dimensional shaping composition can be made particularly excellent, and the productivity of the three-dimensional shaped object can be made particularly excellent.

It is preferable that the solvent dissolves the water-soluble resin. In this case, the fluidity of the three-dimensional shaping composition can be excellent, and it can more effectively prevent unintentional uneven thickness of the layers 1, which are formed by using the three-dimensional shaping composition. Further, when forming the layers 1 in a state in which solvent is removed, the water-soluble resin can be adhered to the particles with higher uniformity and it can more effectively prevent the unevenness of compositions from occurring unintentionally. Therefore, it can more effectively prevent the unevenness of mechanical strength from occurring unintentionally in each part of the three-dimensional shaped object to be finally obtained, and the reliability of the three-dimensional shaped object can be more enhanced.

As a solvent constituting the three-dimensional shaping composition, for example, the following can be exemplified: water; alcoholic solvent such as methanol, ethanol, isopropanol, etc.; ketone solvents such as methyl ethyl ketone, acetone, etc.; glycol ether series such as ethylene glycol monoethyl ether, ethylene glycol monobutyl ether, etc., glycol ether acetate series such as propylene glycol 1-monomethyl ether 2-acetate, propylene glycol 1-monoethyl ether 2-acetate, etc.; polyethylene glycol, polypropylene glycol, etc. It can be used by combining one or more selected from these solvents.

Among such solvents, the three-dimensional shaping composition preferably includes water. In this case, the water-soluble resin can be surely solved, the fluidity of the three-dimensional shaping composition and the uniformity of the composition of the layers 1 formed by the three-dimensional shaping composition can be made particularly excellent. Further, water can be easily removed after the layers 1 are formed, and hardly exerts an adverse effect even if it is remained in the three-dimensional shaped object. Also, it has advantage from the viewpoint of safety for the operator and the environmental problems.

In a case in which the three-dimensional shaping composition includes a solvent, the content ratio of the solvent in the three-dimensional shaping composition is preferably 5 mass % to 75 mass %, and more preferably, 35 mass % to 70 mass %. In this case, the effects by including the aforementioned solvents are remarkably demonstrated, and since the solvent can be easily removed in the short-period of time in the manufacturing process of the three-dimensional shaped object, it has an advantage from the viewpoint of the improvement of the productivity.

Specifically, when the three-dimensional shaping composition includes water, the content ratio of water in the three-dimensional shaping composition is preferably 20 mass % to 73 mass %, and more preferably, 50 mass % to 70 mass %. In this case, the aforementioned effects are remarkably demonstrated.

Other Components

Further, the three-dimensional shaping composition may include components other than the aforementioned components. As such components, for example, the following can be exemplified: polymerization initiator; polymerization accelerator; penetration enhancer; wetting agent (humectant); fixing agent; antifungal agent; preservative; antioxidant; ultraviolet absorber; chelating agent; pH adjuster, etc.

7. Bonding Liquid

Next, the bonding liquid will be described in detail.

Bonding Agent

The bonding liquid includes at least the bonding agent. The bonding agent is a component having a function to bond particles by curing.

As a bonding agent, although it is not especially limited, hydrophobic (lipophilic) agents are preferably used. With this, for example, in a case in which particles subjected to a hydrophobic treatment are used, the affinity between the bonding liquid and the particles can be enhanced, and since the bonding liquid is applied to the layer 1, the bonding liquid can suitably penetrate into the pores of the particles. As a result, the anchor effect of the bonding agent is appropriately demonstrated, and the mechanical strength of the three-dimensional shaped object to be finally obtained can be excellent. In addition, in the present invention, the hydrophobic curing resin can be any hydrophobic curing resin having sufficiently low affinity with respect to water, but it is preferable that, for example, the solubility to water at 25° C. is 1 (g/100 g water) or less.

As the bonding agent, for example, various light curable resins such as thermoplastic resin, thermosetting resin, visible light curable resin which is cured by light from a visible light region (light curable resin in a limited sense), ultraviolet curable resin, infrared curable resin, etc., and X-ray curable resins, etc., can be exemplified, and one or more selected among them can be combined and used. Among them, in view of the mechanical strength of the three-dimensional shaped object, the productivity of the three-dimensional shaped object to be obtained, etc., it is preferable that the bonding agent is a curing resin. Further, among various curing resins, in view of the mechanical strength of the three-dimensional shaped object, the productivity of the three-dimensional shaped object to be obtained, preservation stability for the bonding liquid, etc., the ultraviolet curing resin (polymerizable compound) is especially preferable.

As the ultraviolet curable resin (polymerizable compound), it is preferable to use the resin producing a polymer by starting addition-polymerization or ring-opening polymerization by radical species or cationic species produced from the photopolymerization initiator by emitting the ultraviolet light. As a polymerization method of addition polymerization, radical, cation, anion, metathesis, and coordination polymerization can be exemplified. Further, as a polymerization method of the ring-open polymerization, cation, anion, metathesis, and coordination polymerization can be exemplified.

As an addition-polymerizable compound, for example, a compound having at least one ethylenically unsaturated double bond, etc., can be exemplified. As the addition-polymerizable compound, a compound having at least one terminal ethylenically unsaturated bond, or preferably two terminal ethylenically unsaturated bond can be used.

The ethylenically unsaturated polymerizable compound has a chemical formation of monofunctional polymerizable compound, a multifunctional polymerizable compound, or the mixture of these compounds. As the monofunctional polymerizable compound, for example, an unsaturated carboxylic acid (for example, acrylic acid, methacrylic acid, itaconic acid, crotonic acid, isocrotonic acid, maleic acid, etc.) or their esters, amides, etc., can be exemplified. As the multifunctional polymerizable compound, esters of unsaturated carboxylic acid and aliphatic polyhydric alcohol compound, amides of unsaturated carboxylic acid and aliphatic amine compound are used.

Further, unsaturated carboxylic ester having nucleophilic substituent such as hydroxyl group, amino group, mercapto group, etc., an addition reaction product of amides and isocyanates, epoxies, and dehydration condensation reaction product of carboxylic acid, etc. can be used. Further, unsaturated carboxylic ester having electrophilic substituent such as isocyanate group, epoxy group, etc., or an addition reaction product of amides, alcohols, amines, and thiols, and in addition, unsaturated carboxylic ester having leaving substituent such as halogen group, tosyloxy group, etc. or substitution reaction product of amides, alcohols, amines, and thiols can be used.

As a specific example of a radical polymerizable compound, which is esters of unsaturated carboxylic acid and aliphatic polyhydric alcohol compound, for example, although a (meth) acrylic acid ester is typical, either monofunctional or multifunctional radical polymerizable compounds can be used.

As specific examples of a monofunctional (meth) acrylate, for example, tolyloxyethyl (meth)acrylate, phenyloxyethyl (meth)acrylate, cyclohexyl (meth)acrylate, ethyl (meth)acrylate, methyl (meth)acrylate, isobornyl (meth) acrylate, tetrahydrofurfuryl (meth)acrylate, etc., can be exemplified.

As specific examples of a bifunctional (meth)acrylate, for example, ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth) acrylate, tetraethylene glycol di(meth)acrylate, pentaerythritol di(meth)acrylate, dipentaerythritol di(meth)acrylate, etc., can be exemplified.

As specific examples of the trifunctional (meth)acrylate, for example, trimethylolpropane tri(meth)acrylate, trimethylol ethane tri(meth)acrylate, alkylene oxide-modified tri (meth)acrylate of trimethylolpropane, pentaerythritol tri (meth)acrylate, dipentaerythritol tri(meth)acrylate, trimethylol propane tri((meth)acryloyloxypropyl)ether, isocyanuric acid alkylene oxide-modified tri(meth)acrylate, propionic acid dipentaerythritol tri(meth)acrylate, tri((meth) acryloyloxyethyl)isocyanurate, hydroxypivalaldehyde-modified dimethylol propane tri(meth)acrylate, sorbitol tri (meth)acrylate, etc., can be exemplified.

As specific examples of a tetrafunctional (meth) acrylate, for example, pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritoltetra(meth)acrylate, etc., can be exemplified.

As specific examples of a pentafunctional (meth)acrylate, for example, sorbitol penta(meth)acrylate, dipentaerythritol penta(meth)acrylate, etc., can be exemplified.

As specific examples of a hexafunctional (meth) acrylate, for example, dipentaerythritol hexa(meth)acrylate, sorbitol hexa(meth)acrylate, alkylene oxide-modified hexa(meth) acrylate of phosphazene, caprolactone-modified dipentaerythritol hexa(meth)acrylate, etc., can be exemplified.

As a polymerizable compound other than (meth)acrylate, for example, itaconic acid ester, crotonic acid ester, isocrotonic acid ester, maleic acid ester, etc., can be exemplified.

As an itaconic acid ester, for example, ethylene glycol diitaconate, propylene glycol diitaconate, 1,3-butane diol diitaconate, 1,4-butane diol diitaconate, tetramethylene glycol diitaconate, pentaerythritol diitaconate, sorbitol tetraitaconate, etc., can be exemplified.

As a crotonic acid ester, for example, ethylene glycol dicrotonate, tetramethylene glycol dicrotonate, pentaerythritol dicrotonate, sorbitol tetra dicrotonate, etc., can be exemplified.

As an isocrotonic acid ester, for example, ethylene glycol diisocrotonate, pentaerythritol diisocrotonate, sorbitol tetraisocrotonate, etc., can be exemplified.

As a maleic acid ester, for example, ethylene glycol dimaleate, triethylene glycol dimaleate, pentaerythritol dimaleate, sorbitol tetra maleate, etc., can be exemplified.

As examples of other esters, for example, fatty alcohol esters as disclosed in Japanese Examined Patent Publication No. 46-27926, Japanese Examined Patent Publication No. 51-47334, and Japanese Laid-open Patent Application Publication No. 57-196231, esters having aromatic skeleton as disclosed in Japanese Laid-open Patent Application Publication No. 59-5240, Japanese Laid-open Patent Application Publication No. 59-5241, and Japanese Laid-open Patent Application Publication No. 2-226149, and esters including amino group as disclosed in Japanese Laid-open Patent Application Publication No. 1-165613, etc., can be used.

Further, as specific examples of amino monomer of unsaturated carboxylic acid and aliphatic polyamine compound, for example, methylenebis-acrylamide, methylenebis-methacrylamide, 1,6-hexamethylenebis-acrylamide, 1,6-hexamethylenebis-methacrylamide, diethylenetriamine tris acrylamide, xylylenebis-acrylamide, xylylenebis-methacrylamide, etc., can be exemplified.

As other preferred amide-based monomers, for example, amid-based monomer having a cyclohexylene structure as described in Japanese Examined Patent Publication No. 54-21726, etc., can be exemplified.

Further, an urethane based addition polymerizable compound produced using addition reaction of isocyanate and hydroxyl groups is also preferable, and as specific examples, for example, a vinyl urethane compound including 2 or more polymerizable vinyl groups in one molecule, in which a vinyl monomer including a hydroxyl group as shown by the following formula (1) is added to a polyisocyanate compound having two or more isocyanate groups in one molecule as described in Japanese Examined Patent Publication No. 48-41708, etc., can be exemplified.

$$CH_2=C(R^1)COOCH_2CH(R^2)OH \quad (1)$$

(In the formula (1), $R^1$ and $R^2$ individually represent H or $CH^3$, respectively.)

In the present invention, a cationic ring-opening polymerization compound having one or more cyclic ether groups such as epoxy group, oxetane group, etc., in a molecule can be suitably used as an ultraviolet curable resin (polymerizable compound).

As a cationic polymerizable compound, for example, curable compounds including ring-opening polymerization group, etc., can be exemplified, and among them, a heterocyclic group-containing curable compound is especially preferred. As such curable compound, for example, the followings are exemplified: cyclic imino ethers such as epoxy derivative, oxetane derivative, tetrahydrofuran derivative, cyclic lactone derivative, cyclic carbonate derivative, oxazoline derivative, etc., vinyl ethers, etc., and among these compounds, epoxy derivative, oxetane derivative, and vinyl ethers are preferred.

As an example of preferred epoxy derivative, for example, monofunctional glycidyl ethers, multifunctional glycidyl ethers, monofunctional alicyclic epoxies, polyfunctional alicyclic epoxies, etc., can be exemplified.

As an example of specific compounds of glycidyl ethers, for example, the followings are exemplified: diglycidyl ethers (e.g., ethylene glycol diglycidyl ether, bisphenol A diglycidyl ether, etc.), more than trifunctional glycidyl ethers (e.g., trimethylol ethane triglycidyl ether, trimethylol propane triglycidyl ether, glycerol triglycidyl ether, triglycidyl tris-hydroxyethyl isocyanurate, etc.), more than tetrafunctional glycidyl ethers (e.g., sorbitol tetraglycidyl ether, pentaerythritol tetraglycyl ether, poly-glycidyl ether of cresol novolac resin, poly-glycidyl ether of phenol novolac resin, etc.), alicyclic epoxies (e.g., CELLOXIDE 2021P, CELLOXIDE 2081, EPOLEAD GT-301, EPOLEAD GT-401 (the aforementioned compounds made by Daicel Chemical Industries, Ltd.), EHPE (Daicel Chemical Industries, Ltd.), polycyclohexyl epoxy methyl ether of phenol novolac resin, etc.), oxetanes (e.g., QX-SQ, PNOX-1009 (the aforementioned compounds made by Toagosei Co., LTD.), etc.

As the polymerizable compounds, it is preferable to use alicyclic epoxy derivative. The phrase "alicyclic epoxy group" refers to the partial structure where the double bond of cycloalkenes ring such as cyclopentene group, cyclohexene group, etc. is epoxidized by an appropriate oxidant such as hydrogen peroxide, peracide, etc.

As the alicyclic epoxy compounds, polyfunctional alicyclic epoxy having two or more cyclohexene oxide groups or cyclopentene oxide groups in a molecule is preferred. As a specific example of the alicyclic epoxy compounds, for example, the followings are exemplified: 4-vinyl cyclohexene dioxide, (3,4-epoxy cyclohexyl) methyl-3,4-epoxycyclohexylcarboxylate, di (3,4-epoxycyclohexyl) adipate, di(3,4-epoxycyclohexylmethyl) adipate, bis(2,3-epoxy cyclopentyl) ether, di(2,3-epoxy-6-methylcyclohexylmethyl) adipate, dicyclopentadiene dioxide, etc.

A glycidyl compound having normal epoxy group, which does not have alicyclic structure in a molecule can be individually used or can be used with the aforementioned alicyclic epoxy compounds.

As such normal glycidyl compound, for example, although glycidyl ether compound, glycidyl ester compound, etc., can be exemplified, the glycidyl ether compound is preferably used.

As a specific example of the glycidyl ether compounds, for example, the followings are exemplified: aromatic glycidyl ether compounds such as 1,3-bis(2,3-epoxypropyloxy) benzene, bisphenol A type epoxy resin, bisphenol F type epoxy resin, phenol novolac type epoxy resin, cresol novolac type epoxy resin, trisphenolmethane type epoxy resin, etc., aliphatic glycidyl ether compounds such as 1,4-butanediol glycidyl ether, glycerol triglycidyl ether, propylene glycol diglycidyl ether, trimethylolpropane tritriacontanoic glycidyl ether, etc. As the glycidyl esters, for example, the followings are exemplified: glycidyl esters of linolenic acid dimer, etc.

As the polymerizable compounds, the compound having oxetanyl group which is four-membered cyclic ether (hereinafter referred to as "oxetane compound") can be used. The compound including oxetanyl group is the compound having one or more oxetanyl group in a molecule.

The content ratio of the bonding agent in the bonding liquid is preferably 80 mass % or more and more preferably 85 mass % or more. In this case, the mechanical strength of the three-dimensional shaped object that is finally obtained can be made particularly excellent.

Other Components

Further, the bonding liquid may include components other than the aforementioned components. As such components, for example, the following can be exemplified: various coloring agents such pigments, dyes, etc.; dispersing agent; surfactant; polymerization initiator; polymerization accelerator; solvent; penetration enhancer; wetting agent (humectant); fixing agent; antifungal agent; preservative; antioxidant; ultraviolet absorber; chelating agent; pH adjuster, thickening agent; fillers, anticoagulant; antifoaming agent, etc.

In particular, since the bonding liquid includes a coloring agent, a three-dimensional shaped object that is colored in a color corresponding to the color of the coloring agent can be obtained.

In particular, by including pigments as a coloring agent, the light resistance of the bonding liquid and the three-dimensional shaped object can be excellent. As the pigment, both inorganic pigments and organic pigments can be used.

As the inorganic pigments, for example, the followings are exemplified: carbon blacks (C.I. pigment black 7) such as furnace black, lampblack, acetylene black, channel black, etc., iron oxide, titanium oxide, etc., and it can be used by combining one or more selected from these inorganic pigments.

Among these inorganic pigments, titanium oxide is preferred to present desirable white.

As the organic pigments, for example, the followings are exemplified: an azo pigment such as an insoluble azo pigment, a condensed azo pigment, azolake, a chelate azo pigment, etc., a polycyclic pigment such as a phthalocyanine pigment, a perylene and perynone pigment, an anthraquinone pigment, a quinacridone pigment, a dioxane pigment, a thioindigo pigment, an isoindolinone pigment, a quinophthalone pigment, etc., dye chelate (e.g., basic dye type chelate, acidic dye type chelate, etc.), dye type lake (e.g., basic dye type lake, acidic dye type lake, etc.), nitro pigment, nitroso pigment, aniline black, daylight fluorescent pigment, etc., and it can be used by combining one or more selected from these organic pigments.

In further detail, as the carbon black used as a black pigment (black), for example, the followings are exemplified: No. 2300, No. 900, MCF88, No. 33, No. 40, No. 45, No. 52, MA7, MA8, MA100, No. 2200B, etc. (the aforementioned pigments made by Mitsubishi Chemical Corporation), Raven 5750, Raven 5250, Raven 5000, Raven 3500, Raven 1255, Raven 700, etc. (the aforementioned pigments made by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, etc. (the aforementioned pigments made by CABOT JAPAN K.K.), Color Black FW1, Color Black FW2, Color Black FW2V, Color Black FW18, Color Black FW200, Color Black 5150, Color Black S160, Color Black 5170, Printex 35, Printex U, Printex V, Printex 140U, Special Black 6, Special Black 5, Special Black 4A, Special Black 4, etc. (the aforementioned pigments made by Degussa Corporation).

As a white pigment (white), for example, the followings are exemplified: C.I. Pigment White 6, 18, 21, etc.

As a yellow pigment (yellow), for example, for example, the followings are exemplified: C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, etc.

As a magenta pigment (magenta), for example, the followings are exemplified: C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, 50, etc.

As a cyan pigment (cyan), for example, the followings are exemplified: for example, C.I. Pigment Blue 1, 2, 3, 15, 15:1, 15:2, 15:3, 15:34, 15:4, 16, 18, 22, 25, 60, 65, 66, C.I. Bat Blue 4, 60, etc.

Further, as pigments other than the aforementioned pigments, for example, the followings are exemplified: C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, 63, etc.

In a case in which the bonding liquid includes pigments, the average grain diameter of the pigments is preferably 300 nm or less, and more preferably, 50 nm to 300 nm. With this, the ejection stability of the bonding liquid and the dispersion stability of the pigments in the bonding liquid can be made particularly excellent, and images having superior image quality can be formed.

In a case in which the bonding liquid includes pigments and the particles are porous, it is preferable that the relationship of d1/d2>1 is satisfied when the average pore diameter of the particles is d1 (nm) and the average grain diameter of the pigments is d2 (nm), and more preferable when the relationship of 1.1≤d1/d2≤6 is satisfied. By satisfying such a relationship, the pigments can be appropriately maintained inside the pores of the particles. For this reason, unintentional dispersion of pigments can be prevented, which in turn can more assuredly form an image with high definition.

Further, as a dye, for example, the followings are exemplified: an acidic dye, a direct dye, a reactive dye, a basic dye, etc. It can be used by combining one or more selected from these dyes.

As a specific example of dyes, for example, the followings are exemplified: C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C.I. Food Black 1, 2, C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, C.I. Reactive Black 3, 4, 35, etc.

In a case in which the bonding liquid includes a coloring agent, it is preferable that the content rate of the coloring agent in the bonding liquid is 1 mass % to 20 mass %. With this, particularly excellent concealment and color reproducibility can be obtained.

In particular, in a case in which the bonding liquid includes titanium oxide as the coloring agent, it is preferable that the content ratio of the titanium oxide in the bonding liquid is 12 mass % to 18 mass %, and more preferably, 14 mass % to 16 mass %. In this case, particularly excellent concealment can be obtained.

In a case in which the bonding liquid includes pigments, when dispersant is also included, the dispersing property of the pigment can be made more excellent. As a result, a decrease in the partial mechanical strength due to the deviation of pigments can be more effectively suppressed.

As a dispersant, it is not especially limited, but for example, a dispersant commonly used for preparing the pigment dispersion solution such as a polymer dispersant, etc., is exemplified. As specific examples of polymer dispersants, for example, a polymer dispersant having one or more among the following as the main component is exemplified: polyoxyalkylene polyamine, vinyl polymer and copolymer, acrylic polymer and copolymer, polyester, polyamide, polyimide, polyurethane, amino-based polymer, silicon-containing polymer, sulfur-containing polymer, fluorine-containing polymer, and epoxy resin. As a commercial product of polymer dispersant, for example, Ajisper series manufactured by Ajinomono Fine-Techno Co., Inc., Solsperse series (Solsperse 36000, etc.) available from Noveon, Inc., Disperbyk series manufactured by BYK, Disparlon series manufactured by Kasumoto Chemicals. Ltd., etc., is exemplified.

When the bonding liquid includes a surfactant, the friction resistance of the three-dimensional shaped object can be made more excellent. A surfactant is not especially limited, but for example, a polyester-modified silicone, a polyether-modified silicone, etc., as a silicone-type surfactant can be used, and among them, it is preferable that a polyether-modified polydimethylsiloxane or a polyester-modified polydimethylsiloxane is used. As a specific example of the surfactant, for example, BYK-247, BYK-348, BYK-UV3500, 3510, 3530, 3570 (names of products manufactured by BYK Co.), etc., can be exemplified.

Further, the bonding liquid may include a solvent. With this, the adjustment to the viscosity of the bonding liquid can be appropriately performed, and even when the bonding liquid includes a component having high viscosity, the ejection stability of the inkjet method for the bonding liquid can be made particularly excellent.

As a solvent, for example, the followings are exemplified: (poly)alkylene glycol monoalkyl ethers such as ethylene glycol monomethyl ether, ethylene glycol monoethyl ether, propylene glycol monomethyl ether, propylene glycol monoethyl ether, etc.; acetic acid esters such as ethyl acetate, n-propyl acetate, iso-propyl acetate, n-butyl acetate, iso-butyl acetate, etc.; aromatic hydrocarbons such as benzene, toluene, xylene, etc.; ketones such as methylethyl ketone, acetone, methyl isobutyl ketone, ethyl-n-butyl ketone, diisopropyl ketone, acetylacetone, etc.; alcohols such as ethanol, propanol, butanol, etc., and it can be used by combining one or more selected from these solvents.

Further, it is preferable that the viscosity of the bonding liquid is 10 mPa·s to 25 mPa·s, and more preferably 15 mPa·s to 20 mPa·s. With this, the ejection stability of ink for the inkjet method can be made particularly excellent. In this specification, viscosity is a value measured by an E-type viscometer (VISCONIC ELD manufactured by Tokyo Keiki, Inc.) at 25° C.

In a case in which plural types of bonding liquids are used, it is preferable that at least a blue violet colored (cyan) bonding liquid, a crimson purple colored (magenta) bonding liquid, and a yellow colored (yellow) bonding liquid are used. With this, the color reproduction area to be expressed can be made wider by the combination of such bonding liquids.

Further, by using a white colored (white) bonding liquid and another colored bonding liquid together, for example, the following effects can be obtained. That is, the three-dimensional shaped object to be finally obtained can be provided with a first region in which a white colored (white) bonding liquid is applied and a region which overlaps with the first region and provided more to the outer surface side of the first region, in which a colored bonding liquid other than the white color is applied. With this, the first region to which the white colored (white) bonding liquid is applied can demonstrate concealment, and the chroma of the three-dimensional shaped object can be enhanced.

Further, by using a white colored (white) bonding liquid, a black colored (black) bonding liquid, and another colored bonding liquid together, for example, the following effects can be obtained. That is, by combining the use of the white colored (white) bonding liquid, it becomes possible to express lighter and brighter colors than what another colored bonding liquid is capable of expressing, and by combining the use of the black colored (black) bonding liquid, it becomes possible to express lighter and darker colors than what another colored bonding liquid is capable of expressing, the chroma of the three-dimensional shaped object can be enhanced more and the range of the expression of brightness can be widened.

Although preferred embodiments of the present invention have been described above, the present invention is not limited to them.

For example, in the aforementioned embodiment, although a configuration in which the collection section and the shaping section were formed separately was explained, it is not limited to that, and the collection section and the shaping section can be integrally formed. In this case, the layer 1 can be formed by the movement of the shaping section and the collection section, without moving the squeegee.

Further, in the manufacturing method according to the present invention, a pretreatment process, an intermediate process, and a post-treatment process can be performed as necessary.

As a pretreatment process, for example, a cleaning process of the shaping stage, etc., is exemplified.

As a post-treatment process, for example, a shape adjustment process for performing a cleaning process, deburring, etc., a coloring process, a coating layer forming process, a curable resin curing completion process for performing a light irradiation treatment and a heat treatment for assuredly curing an uncured hardening resin, etc., are exemplified.

Further, in the aforementioned embodiments, although a case in which the ejection process is performed by an inkjet method was centrally explained, the ejection process can be performed using another method (e.g., another print method).

Further, in the aforementioned embodiments, although it was explained that powder was bonded using a bonding liquid, it is not limited to that, and for example, powder can be bonded by being dissolved by a heating unit such as laser.

Further, in the aforementioned embodiments, the same surface as the top surface of the frame body 101 was set as the reference position S, it is not limited to that, and for example, the same surface as the top surface of the supply area 111 and the top surface of the shaping stage 102 can be the reference position S.

Further, the reference position S is not required to be the same surface as the top surface of the frame body 101 or a certain surface existing inside the device such as the same surface as the top surface of the supply area 111, and an initial value recorded in advance can be the reference position S.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A three-dimensional shaped object manufacturing device adapted to manufacture a three-dimensional shaped object by laminating a layer formed using a three-dimensional shaping composition including three-dimensional shaping powder, the three-dimensional shaped object manufacturing device comprising:
   a shaping section configured and arranged to shape the three-dimensional shaped object;
   a layer forming unit configured and arranged to form the layer constituted by the three-dimensional shaping composition in the shaping section and having a bottom tip end; and
   a distance detecting unit configured and arranged to detect a distance from a predetermined reference position to the bottom tip end of the layer forming unit, and contact the bottom tip end of the layer forming unit,
   the bottom tip end being configured and arranged to be positioned above the distance detecting unit and face the distance detecting unit in a lamination direction while the layer forming unit is positioned at a first position, the lamination direction being a direction in which the layer is configured to be laminated on the shaping section,
   the distance direction unit being configured and arranged to detect the distance while the distance detecting unit contacts the bottom tip end of the layer forming unit and the layer forming unit is positioned at the first position.

2. The three-dimensional shaped object manufacturing device according to claim 1, wherein
   a thickness of the layer is adjusted depending on a detection result of the distance detecting unit.

3. The three-dimensional shaped object manufacturing device according to claim 1, wherein
   the shaping section includes a vertically movable shaping stage, and
   a thickness of the layer is adjusted by adjusting a lowering amount of the shaping stage.

4. The three-dimensional shaped object manufacturing device according to claim 1, wherein a distance from the reference position to the layer forming unit is adjusted by moving the layer forming unit.

5. The three-dimensional shaped object manufacturing device according to claim 1, wherein
the layer forming unit is a unit selected from a group consisting of a squeegee and a roller.

6. A method of manufacturing a three-dimensional shaped object using the three-dimensional shaped object manufacturing device according to claim 1, the method comprising:
forming the layer in the shaping section using the layer forming unit; and
detecting the distance from the reference position to the bottom tip end of the layer forming unit using the distance detecting unit while the distance detecting unit contacts the bottom tip end of the layer forming unit and the layer forming unit is positioned at the first position.

7. A three-dimensional shaped object manufactured by the three-dimensional shaped object manufacturing device according to claim 1.

8. A three-dimensional shaped object manufactured by the method of manufacturing the three-dimensional shaped object according to claim 6.

9. The three-dimensional shaped object manufacturing device according to claim 1, wherein
the distance detecting unit is a contact-type probe-type sensor.

10. The three-dimensional shaped object manufacturing device according to claim 1, wherein
the layer forming unit is configured and arranged to move in a first movement direction between the first position and a second position where the layer forming unit is positioned above the shaping section and is not positioned above the distance detecting unit, and the first movement direction is perpendicular to the lamination direction.

11. The three-dimensional shaped object manufacturing device according to claim 1, wherein
the distance detecting unit is further configured and arranged to move in a second movement direction perpendicular to the lamination direction, and
the distance direction unit is configured and arranged to detect the distance while the distance detecting unit contacts the bottom tip end of the layer forming unit and is moving in the second movement direction, and while the layer forming unit is positioned at the first position.

12. The three-dimensional shaped object manufacturing device according to claim 10, wherein
the distance detecting unit is further configured and arranged to move in a second movement direction perpendicular to the lamination direction, and
the layer forming unit is configured and arranged to move in the first movement direction that is further perpendicular to the second movement direction.

13. The method of manufacturing the three-dimensional shaped object according to claim 6, wherein
the detecting of the distance includes detecting the distance while the distance detecting unit contacts the bottom tip end of the layer forming unit and is moving in a second movement direction perpendicular to the lamination direction, and while the layer forming unit is positioned at the first position.

14. The three-dimensional shaped object manufacturing device according to claim 1, wherein
while the layer forming unit is positioned at the first position such that the bottom tip end faces the distance detecting unit in the lamination direction and the distance direction unit detects the distance, the layer forming unit is positioned so as not to overlap the shaping section in the lamination direction.

* * * * *